(12) United States Patent
Süsse

(10) Patent No.: US 10,926,827 B2
(45) Date of Patent: Feb. 23, 2021

(54) ECCENTRIC BICYCLE FORK SHAFT

(71) Applicant: Scott Sports SA, Givisiez (CH)

(72) Inventor: Ricco Süsse, Givisiez (CH)

(73) Assignee: SCOTT SPORTS SA, Givisiez (CH)

( * ) Notice: Subject to any disclaimer, the term of this patent is extended or adjusted under 35 U.S.C. 154(b) by 319 days.

(21) Appl. No.: 16/133,886

(22) Filed: Sep. 18, 2018

(65) Prior Publication Data

US 2019/0092417 A1    Mar. 28, 2019

(30) Foreign Application Priority Data

Sep. 26, 2017  (DE) .................... 20 2017 004 993.7

(51) Int. Cl.

| | | |
|---|---|---|
| *B62K 21/02* | (2006.01) | |
| *B62J 99/00* | (2020.01) | |
| *B62K 19/32* | (2006.01) | |
| *B62K 21/06* | (2006.01) | |
| *B62K 21/18* | (2006.01) | |
| *B62J 11/13* | (2020.01) | |

(52) U.S. Cl.
CPC .............. *B62K 21/02* (2013.01); *B62J 99/00* (2013.01); *B62K 19/32* (2013.01); *B62K 21/06* (2013.01); *B62K 21/18* (2013.01); *B62J 11/13* (2020.02)

(58) Field of Classification Search
CPC ........ B62K 21/02; B62K 19/32; B62K 21/06; B62K 21/18
See application file for complete search history.

(56) References Cited

U.S. PATENT DOCUMENTS

| | | | | |
|---|---|---|---|---|
| 2,687,898 | A * | 8/1954 | Schwinn ................ | B62K 25/08 280/276 |
| 7,891,687 | B2 * | 2/2011 | Schmider ............... | B62K 19/30 280/281.1 |
| 7,938,422 | B2 * | 5/2011 | Clari ...................... | B62K 21/04 280/280 |
| 7,976,045 | B2 * | 7/2011 | Lane ...................... | B62K 19/16 280/279 |
| 8,684,386 | B2 * | 4/2014 | Matthews .............. | B62K 19/32 280/279 |
| 9,056,646 | B1 * | 6/2015 | D'Aluisio .............. | B62K 19/06 |
| 9,079,631 | B1 * | 7/2015 | Costa ..................... | B62K 19/30 |
| 9,446,812 | B2 * | 9/2016 | Nago ..................... | B62K 21/12 |

(Continued)

FOREIGN PATENT DOCUMENTS

DE        202017004993 U1    10/2017

*Primary Examiner* — Kevin Hurley
*Assistant Examiner* — Michael R Stabley
(74) *Attorney, Agent, or Firm* — J-Tek Law PLLC; Jeffrey D. Tekanic; Scott T. Wakeman

(57) ABSTRACT

A bicycle fork includes a fork shaft configured to be rotatably borne by headset bearings in a head tube of a bicycle frame so as to rotate about a steering axis. The fork shaft includes a cylindrical fork shaft segment that is disposed eccentrically with respect to the steering axis. The cylindrical fork shaft segment is a right circular cylinder having a hollow interior, a cylindrical inner surface and a central longitudinal axis that lies within a symmetry plane of the bicycle frame and extends parallel to the steering axis. The central longitudinal axis of the cylindrical fork shaft segment is spaced apart from the steering axis in a direction of eccentricity that points in an opposite direction with respect to a forward direction of travel of the bicycle.

20 Claims, 4 Drawing Sheets

(56) References Cited

U.S. PATENT DOCUMENTS

| | | | | |
|---|---|---|---|---|
| 9,701,293 B2 * | 7/2017 | D'Aluisio | .............. | B62M 25/02 |
| 10,737,740 B2 * | 8/2020 | D'Aluisio | .............. | B62K 19/32 |
| 2011/0120256 A1 * | 5/2011 | Giroux | ................... | B62K 23/06 |
| | | | | 74/502.2 |
| 2011/0121538 A1 * | 5/2011 | Giroux | ................... | B62K 23/06 |
| | | | | 280/280 |
| 2015/0259022 A1 * | 9/2015 | Nago | ..................... | B62K 21/12 |
| | | | | 74/551.1 |
| 2015/0367825 A1 * | 12/2015 | D'Aluisio | .............. | B62K 21/22 |
| | | | | 29/428 |
| 2019/0185100 A1 * | 6/2019 | D'Aluisio | .............. | B62K 21/04 |

* cited by examiner

ECCENTRIC BICYCLE FORK SHAFT

CROSS-REFERENCE TO RELATED APPLICATION

This application claims priority to German utility model application no. 20 2017 004 993.7 filed on Sep. 26, 2017, the contents of which are fully incorporated herein by reference.

TECHNICAL FIELD

The present invention relates to a bicycle fork, a bicycle frame having a bicycle fork and a corresponding bicycle.

BACKGROUND

In bicycles steering impulses induced on the handlebar are transferred via a handlebar stem and further, via a force- and friction-fit, rotationally rigid connection, to the fork shaft of a bicycle fork, which holds a front wheel. For this purpose, the fork shaft of the bicycle fork is borne in a head tube of the bicycle frame so as to be rotatable about a steering- or control axis. This is usually done with the aid of two headset bearings, which are respectively disposed at the upper end and the lower end of the head tube and which determine the steering axis. Also the upper and lower tubes of the bicycle frame typically open into the head tube and create a conjoined, continuous interior space within the bicycle frame.

For example, angular contact ball bearings having standardized dimensions preferably are used as the headset bearings, in order to minimize the component costs. Typical dimensions are 25.4 mm (1 inch), 28.6 mm (1.125 or 1⅛ inches), 31.8 mm (1.25 or 1¼ inches) or 38.1 mm (1.5 or 1½ inches), wherein the measurements refer to the inner diameter of the bearing. The bearings can further have a 45° chamfer on the inner side, for example, in order to improve the engagement (seating) on conically shaped, external components. Further, it is known to utilize tapered fork shafts that taper toward the upper end and accordingly to utilize headset bearings having different sizes, i.e. an upper headset bearing that is smaller than the lower headset bearing, for example 1.5 inches as the lower bearing and 1.25 inches as the upper headset bearing.

The fork shaft of a bicycle fork usually directly adjoins the fork crown, and forms the upper segment or the upper end of the bicycle fork. In this case, the fork shaft usually extends through both of the headset bearings and projects above the upper headset bearing. In other words, at least the segment of the bicycle fork that is located above the lower side of the lower headset bearing in the intended arrangement of the bicycle fork on the bicycle frame is referred to as the fork shaft. That is, the fork shaft is the upper segment of the bicycle fork down to a seat for the lower headset bearing.

For a play-free bearing of the bicycle fork in the head tube, the fork shaft is braced against the head tube via the headset bearings. If the fork shaft has an external thread, this is done with the aid of a threaded headset, in which a handlebar stem shaft of the handlebar stem is clamped in the hollow interior space of the fork shaft, for example, with the aid of a wedge, in order to realize the above-mentioned friction-fit and/or force-fit, rotationally rigid, and preferably also height-adjustable, connection between the handlebar or handlebar stem and the bicycle fork. If the fork shaft does not have an external thread, the bracing of the fork shaft with respect to the head tube is done with the aid of a non-threaded headset (for example Aheadset®, Diatech®, YST "GeForce"), in which an expander component having a compression claw is clamped in the hollow interior space of the fork shaft, so that a handlebar stem, which is to be fastened on the outside of the fork shaft above the upper headset bearing, can be braced against the headset bearings via the expander component. If the handlebar stem does not directly abut against the upper headset bearing, spacers can be provided between the upper headset bearing and the handlebar stem, whereby the desired height of the handlebar stem on the fork shaft can be adjusted. Here, the fork shaft can also project above the handlebar stem in order to be able, for example, to select an even higher level of the handlebar stem on the fork shaft at a later point in time. In the latter case, in order to facilitate the compression, or the bracing of the bearing, of the stem (handlebar stem unit) and the spacers, against the head tube, a cover can be provided, for example, in the form of a (further) spacer.

Both in the case of a threaded headset and in the case of a non-threaded headset, the components (handlebar stem shaft or expander component) clamped in the interior of the fork shaft necessarily have a circular outer cross section around the fork shaft axis that coincides with the steering axis and are configured to be entirely or substantially cylindrical, optionally also rotationally symmetrical.

In addition to these mechanical requirements, an integrated (internal) guiding of gear shift cables and brake cables has become desirable in recent years. The mechanical, hydraulic or also electrical brake and gear shift cables or -lines are to be guided (internally disposed) starting from the respective operating controls on the handlebar or the handlebar ends to the inner side of the handlebar and the handlebar stem or the handlebar stem unit (Combo), into the bicycle frame and optionally into the bicycle fork. This internal cable guidance requirement has both technical reasons, such as an aerodynamic optimization of the bicycle, in which the wind-exposed area of the bicycle is reduced owing to the internalization of the gear shift and brake cables, and also aesthetic reasons, which take into account the desire for an "integrated" or streamlined appearance of the bicycle.

In one known approach for internalizing cables, the outer shape of the fork shaft is modified, for example flattened, to create a vacant installation space for guiding the brake and/or gear shift cables on the inner side of the upper headset bearing, thereby facilitating the desired cable integration. However, this flattening leads to a reduced mechanical stability of the fork shaft (for example, to a reduction of the bending stiffness or the second-order moment of resistance) and, moreover, requires the usage of a special expander component that fits into the now non-circular or non-cylindrical inner side of the flattened fork shaft. In addition, the vacant installation space created therein is too small in any event to guide (hold) all four cables (for example two mechanical brake cables and two mechanical gear shift cables), so that for example mechanical gear shift cables cannot be guided in entirely integrated (internalized) manner.

In a further known approach, the brake cable of the front wheel brake is guided, for example, via the upper side of the fork shaft through the interior of the fork shaft. In this approach, however, a special expander component must be used, which moreover can be adjusted or tightened only with a special tool. In addition, in this approach, the fork shaft must not project above the handlebar stem and possibly has to be shortened accordingly, which rules out a later raising of the attachment height of the stem on the fork shaft. Further, tight radii of deflection are realized in this case, which results in high frictional losses in mechanical cables and correspondingly imprecise shifting and/or braking, in particular when the cables are guided without a cable sheath.

SUMMARY OF THE DISCLOSURE

It is therefore one non-limiting object of the present teachings to discloses disclose an integrated (internalized) guiding of brake and/or gear shift cables, which, e.g., ensures a high bending stiffness of the fork shaft, the usage of inexpensive, standardized components and/or a high degree of flexibility with respect to the adjustment of the height of the handlebar stem on the fork shaft.

Other objects and advantages of the present teachings will become apparent from the further description of the present invention.

In one aspect of the present teachings, a bicycle fork includes a fork shaft that comprises a cylindrical fork shaft segment configured eccentrically with respect to the steering axis. The bicycle fork or its fork shaft is configured to be held (mounted) in a head tube of a bicycle frame so as to be rotatable relative to the head tube about a steering axis. Accordingly, in the intended arrangement of the present bicycle fork on the bicycle frame, the bicycle frame comprises a head tube, in which the bicycle fork is rotatable borne via an upper and a lower headset bearing. In this case, the headset bearings define the steering- or control axis, about which the bicycle fork is rotatable in the head tube. The cylindrical fork shaft segment has a central longitudinal- and/or symmetry axis that is hereinafter referred to as the fork shaft axis and is different from the steering axis.

In a further aspect of the present teachings, the fork shaft axis (central longitudinal axis) defined by the cylindrical fork shaft segment extends in parallel to the steering axis, and is thus spaced apart from the steering axis (i.e., offset therefrom in a direction of eccentricity by an eccentric distance). The fork shaft axis and the steering axis lie in the symmetry plane of the bicycle fork, in which the front wheel to be held by the bicycle fork also lies when the front wheel is pointed in the forward direction of travel. Preferably, the fork shaft axis is spaced apart from the steering axis by between 1 and 5 mm (eccentric distance), for example by 1, 1.5, 2, 2.5, 3, 3.5, 4, or 5 mm, particularly preferably by 3 mm, wherein each of the mentioned values can also be an upper or lower limit of the mentioned value range. In the intended arrangement of the bicycle fork in the bicycle frame, the direction of eccentricity preferably points opposite to the direction of travel, so that the steering axis is disposed in front of the fork shaft axis in the direction of travel. In other words, the direction of travel points in the forward direction of the bicycle and the direction of eccentricity points in the rearward direction of the bicycle, using the steering axis as the point of origin.

The cylindrical fork shaft segment preferably has a cylindrical, continuous outer surface, and typically forms the upper segment and/or the upper end of the fork shaft and/or bicycle fork. In the intended arrangement of the bicycle fork in the head tube of the bicycle frame, the eccentrically configured, cylindrical fork shaft segment preferably extends through the inner side of the upper headset bearing.

In a plane perpendicular to the steering- and/or the fork shaft axis, the cylindrical fork shaft segment preferably has a circular, continuous outer cross section, the circle center point of which is spaced apart from the steering axis and/or from the intersection point of the cross section with the steering axis. Accordingly, the cylindrical fork shaft segment has a smaller outer diameter than the inside measurement of the upper headset bearing, preferably by an amount (e.g., at least one millimeter) that permits one or more gear shift and/or brake cables to pass (extend) between the outer cylindrical surface of the cylindrical fork shaft segment and the inside cylindrical surface of the upper headset bearing, as will be further discussed below. In this case, a vacant installation space is provided between the eccentric, cylindrical fork shaft segment and the upper headset bearing.

It is noted that a maximum lateral bending stiffness can be ensured by the cylindrical shape of the fork shaft and/or by its circular outer cross section.

Preferably, the cylindrical fork shaft segment has not only a cylindrical outer side, but also has a cylindrical inner side, i.e. it is hollow inside, has a circular inner cross section perpendicular to the fork shaft axis with a preferably constant wall thickness, so that a low-cost standard eccentric component can be fixed in the interior of the fork shaft. Accordingly, usage of a specially shaped expander component is not necessary.

Preferably, the fork shaft of the bicycle fork further has an engaging segment for engaging a lower headset bearing of the head tube. The engaging segment forms the lower end of the fork shaft in the simplest case and preferably is disposed directly below the cylindrical fork shaft segment, i.e. it directly adjoins the cylindrical fork shaft segment. The shape of the engaging segment is adapted (fitted) to the shape of the lower headset bearing and, because it serves as the seat for the lower headset bearing, the shape of the engaging segment defines the location and/or position of the lower headset bearing on the fork shaft and thus usually at the same time defines the location and/or position of the steering axis with respect to the fork shaft.

Preferably, the engaging segment is configured (designed) as a tapered (e.g., cone-shaped or bell-shaped) fork shaft segment, the cone of which forms a frustum of a cone, which is optionally cut obliquely. In such an embodiment, in a plane perpendicular to the steering axis, the cone of the tapered fork shaft segment has a circular outer cross section, the circle center point of which coincides with the steering axis (i.e. the steering axis intersect the circle center point of the cross section of the cone). The cone preferably has an angle in the range of 30° to 60°, more preferably an angle of 45°, with respect to the steering axis, in order to interact with (seat) a corresponding chamfer, for example a 45° chamfer, defined on a lower inner side of the lower headset bearing. Accordingly, the bicycle frame preferably includes a lower headset bearing having a chamfered lower inner side, which forms a frustoconical cone surface in the simplest case, wherein the angle of the chamfer is in the range of 30° to 60° with respect to the steering axis and preferably is (about) 45°. The (virtual) cone tip of both cones lies on the steering axis and points toward the upper end of the bicycle fork. In this case, a frustoconical support surface of the lower headset bearing preferably results on the tapered fork shaft segment, which frustoconical support surface has a width preferably between 3 and 10 mm, for example 3, 4, 5, 6, 8 or 10 mm, preferably 5 mm, on the cone surface, wherein each of the mentioned values can be an upper or lower limit of the mentioned range.

Preferably the engaging segment and/or the tapered fork shaft segment has a height along the steering or fork shaft axis of 3 to 10 mm, for example 3, 4, 5, 6, 8 or 10 mm, preferably 5 mm, wherein each of the mentioned values can be an upper or lower limit of the mentioned range. The entire fork shaft preferably has a length between 100 and 400 mm, for example 100, 120, 150, 200, 250, 300, 350 or 400 mm, wherein each of the mentioned values can be an upper or lower limit of the mentioned range. Accordingly, the cylindrical fork shaft segment has a length along the fork shaft axis between 90 and 397 mm, for example 90, 100, 150, 200, 250, 300, 350 or 397 mm, wherein each of the mentioned values can be an upper or lower limit of the mentioned range of values.

Preferably, the fork shaft comprises, or optionally consists of, the engaging segment or the tapered fork shaft segment, the cylindrical fork shaft segment, and preferably a feed-through or a feed-through opening for the brake cable of the front wheel brake. The feed-through or feed-through opening is preferably disposed at the junction between the engaging segment or the tapered fork shaft segment and the cylindrical fork shaft segment.

In order to facilitate a play-free bearing of the fork shaft in the upper headset bearing, a reduction sleeve ("washer") preferably is provided that engages or sits (usually engages/sits in a form-fit manner) on the cylindrical fork segment (usually on its outer side) and on the upper headset bearing (usually on its inner side), and thus mechanically connects and/or fixedly positions the cylindrical fork shaft segment and the upper headset bearing relative to each other with the vacant installation space disposed between the cylindrical fork shaft segment and the upper headset bearing. For this purpose, the preferably single-piece reduction sleeve has an engaging segment for engaging (sitting) on the upper headset bearing, which is preferably configured analogously and/or symmetrically to the engaging segment at the lower end of the fork shaft. Accordingly, the engaging segment of the reduction sleeve preferably has a frustoconical or tapered segment of preferably constant height which, in a sectional plane perpendicular to the steering axis, has a circular outer cross section, the circle center point of which coincides with the steering axis. Similar to the engaging segment of the fork shaft, the height of the engaging segment of the reduction sleeve is preferably in the range of 3 to 10 mm and preferably amounts to 5 mm. Further, the cone preferably has an angle in the range of 30° to 60°, more preferably an angle of 45°, with respect to the steering axis, thereby facilitating engagement (seating) on a 45° chamfer of an upper inner side of the upper headset bearing. The numerical values mentioned above in connection with the engaging segment of the fork shaft apply analogously also to the engaging segment of the reduction sleeve. However, the cone tip of the tapered, frustoconical segment of the reduction sleeve points downwards, i.e. toward the lower headset bearing.

Further, for engagement (seating) on the cylindrical fork shaft segment, the reduction sleeve further preferably comprises a circular through-hole that is configured eccentrically with respect to the engaging segment of the reduction sleeve, in particular corresponding to the eccentric arrangement of the cylindrical fork shaft segment with respect to the steering axis.

Further, the reduction sleeve preferably comprises a continuous, preferably elongated guide window for brake and/or gear shift cables or their sheaths, wherein the guide window is preferably configured for guiding-through (holding) four cables or cable sheaths, particularly preferably for guiding-through (holding) the cable sheaths of two brake cables and two gear shift cables. In this case, the guide window is disposed between the circular through-hole and the engaging segment, so that four cable sheaths can be guided-through (held) between the fork shaft and the upper headset bearing, wherein the cable sheaths preferably extend side by side and/or directly abutting one another. In this case, when passed through the guide window, the four cables or cable sheaths point in the direction, or substantially in the direction, of the fork shaft axis and/or the steering axis, i.e. they extend parallel or substantially parallel to the fork shaft axis and the steering axis. In this case, it also is provided that mechanical cables, which are protected and/or guided by corresponding cable sheaths, can be guided through the upper headset bearing along the fork shaft, through the guide window. This increases the mechanical protection of the cables, minimizes friction losses and accordingly facilitates precise gear shifting and/or braking.

Preferably, in a plan view of the reduction sleeve, the guide window is configured (shaped) to be elongated and/or curved or kidney-shaped, so that the cables and/or cable sheaths are arranged therein side by side in one layer. The guide window preferably has a width corresponding to the diameter of one cable sheath, preferably a width in the range between 5 and 6 mm, preferably a width of (about) 5.2 mm. Accordingly, the guide window preferably has a length along the hole center, which likewise extends in a curve manner, that corresponds to four cable sheaths, preferably a length in the range between 20 and 25 mm.

As already mentioned, the guide window is disposed between the circular through-hole and the engaging segment, namely starting from the circular through-hole preferably at a location opposite to the direction of eccentricity of the circular through-hole with respect to the engaging segment and/or in or symmetrical to a plane that comprises (intersects) the fork shaft axis and the steering axis. In other words, the guide window is provided (defined) within the reduction sleeve at a location in which the eccentric arrangement of the circular through-hole achieves the largest distance and/or the largest vacant installation space between the circular through-hole and the engaging segment and/or the tapered segment of the reduction sleeve.

Further, a cap ring, which impedes the ingress of dirt and moisture, is disposed on the reduction sleeve. For this purpose, the reduction sleeve preferably has one or more depressions (recesses) on an upper side for form-fit engagement of corresponding protrusions provided (defined) on the cap ring disposed thereabove. In such an embodiment, the bicycle frame preferably has a headset comprising such a cap ring that abuts directly on the reduction sleeve and is preferably located directly underneath the handlebar stem or a spacer. The form-fit engagement accordingly impedes rotation of the cap ring relative to the reduction sleeve about the cylindrical fork shaft segment. Accordingly, the cap ring likewise has a guide window for guiding-through (holding) the brake and/or gear shift cable sheaths, wherein the guide window of the cap ring is configured to be congruent (aligned) with the guide window of the reduction sleeve in the intended arrangement on the reduction sleeve.

Further, a cable stop for one or more, in particular for two or three, mechanical gear shift and/or brake cables is preferably provided in the lower tube of the bicycle frame. In this case, the cable sheaths of the mechanical gear shift and/or brake cables, after passing through the reduction sleeve and the head tube, end at the cable stop in the lower tube, and the mechanical cables can be guided in the interior of the bicycle frame, at least partially or completely, without cable sheaths toward the bottom bracket and/or the rear wheel. In this case, the cable stop is preferably attached at a front end or in the upper third of the lower tube, in particular at a distance of 2 to 20 cm from the steering axis, for example 2, 5, 10, 15 or 20 cm, wherein each of the mentioned values can also be an upper or lower limit of the mentioned range of values. The provision of such a cable stop in the vicinity of the head tube makes it possible to minimize the region (length or extension), in which the mechanical shift cables are guided through the respective cable sheaths, and accordingly to reduce the overall weight of the bicycle frame and thus of the bicycle.

Preferably, it is further provided in the bicycle frame that the brake cable for the front wheel brake, after being passed between the upper headset bearing and the fork shaft, for example through the guide window of the reduction sleeve, enters through a feed-through or feed-through opening in the fork shaft, into the interior of the bicycle fork and, for example, is guided to the front wheel brake through the right or left bicycle fork leg (blade). Accordingly, in the intended arrangement of the bicycle fork in the bicycle frame, the feed-through in the fork shaft is disposed below the reduction sleeve and the upper headset bearing and is disposed above the lower headset bearing. Preferably, the feed-through for the brake cable of the front wheel brake is located in the cylindrical fork shaft segment or at the junction between the cylindrical fork shaft segment and the engaging segment of the fork shaft. Additionally or alternatively to the brake cable for the front wheel brake, a single- or multi-core electrical cable can be guided on the same path, i.e. through the guide window of the reduction sleeve, through the feed-through opening in the fork shaft and through the interior of the bicycle fork, in order to pickup an electrical signal at the front wheel or to transmit it therefrom, for example for the purposes of speed measurement.

Preferably the upper and lower headset bearing have the same measurements (dimensions) and/or inside measurements (diameters), preferably 25.4 mm (1 inch), 28.6 mm (1.125 or 1⅛ inches), 31.8 mm (1.25 or 1¼ inches) or 38.1 mm (1.5 or 1½ inches). The cylindrical fork shaft segment preferably has a (an outer) diameter in the range between 20 and 40 mm, preferably 25.4 mm (1 inch), 28.6 mm (1.125 or 1⅛ inches) or 31.8 mm (1.25 or 1¼ inches).

If 1.5-inch bearings are utilized as the upper and the lower headset bearings, the cylindrical fork shaft segment preferably has an outer diameter of 31.8 mm (1.25 inches), while the engaging segment of the fork shaft segment is configured as a tapered fork shaft segment with a 4° cone, the cone or cone radii of which are at least in the range between 38.1 and 41.6 mm. If 1.25-inch bearings are utilized as the upper and the lower headset bearings, the cylindrical fork shaft segment preferably has an outer diameter of 25.4 mm (1 inch) or 28.6 mm (1.125 inches), while the engaging segment of the fork shaft segment is configured as a tapered fork shaft segment with a 45° cone, the cone or cone radii of which are at least in the range between 28.6 and 32.1 mm or in the range between 31.8 and 35.3 mm, respectively. Thereby, a vacant installation space is ensured between the eccentric, cylindrical fork shaft segment and the upper headset bearing for guiding-through the brake and/or gear shift cables, which typically have a diameter of 5.2 mm.

Preferably, the headsets in the bicycle frame comprise exclusively standard components, whereby the component costs can be minimized. The present teachings further concern a bicycle, e.g., a racing bicycle, comprising a bicycle frame as described above and/or a bicycle fork as described above.

BRIEF DESCRIPTION OF THE DRAWINGS

Further advantages of the invention will be described in the following with reference to the exemplary embodiment illustrated in the accompanying figures. The exemplary embodiment represents a preferred embodiment that does not limit the invention in any way. The figures are schematic depictions that do not necessarily reflect the real proportions, but serve to improve the clarity and understanding of the exemplary embodiment.

DETAILED DESCRIPTION OF AN EXEMPLARY EMBODIMENT

Figure 1:
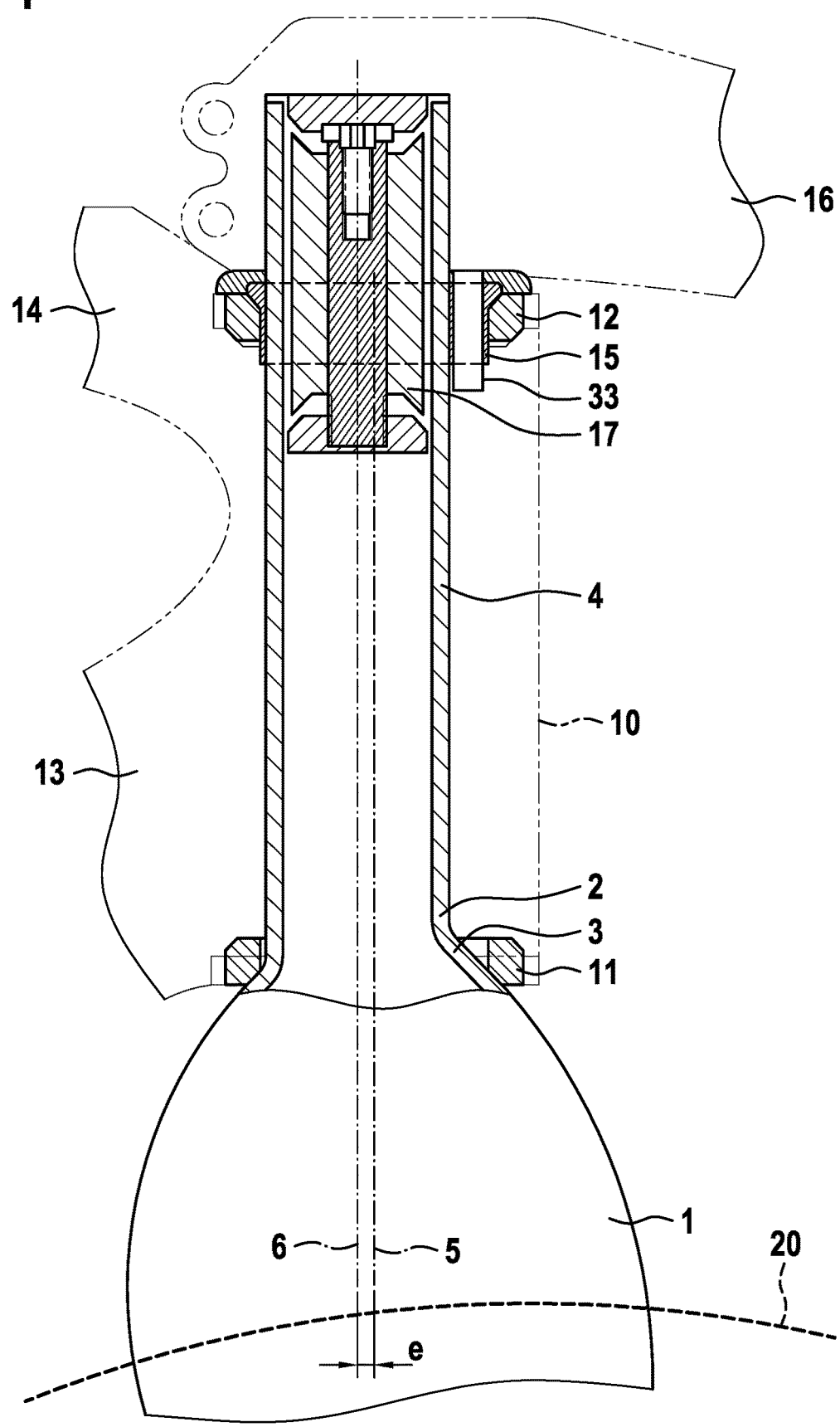
FIG. 1 shows a sectional view of a bicycle fork according to the present teachings borne in a bicycle frame.

A representative, non-limiting bicycle fork 1 according to the present teachings is depicted schematically in the sectional view of FIG. 1. The drawing plane of FIG. 1 comprises (encompasses) the direction of travel and the steering axis 5 and thus at the same time forms the symmetry plane of the bicycle fork, in which symmetry plane the front wheel 20, which is indicated by a dashed line in FIG. 1, to be held by the two legs or blades (not shown) of the bicycle fork also will lie when the bicycle is traveling in the forward direction. A fork shaft (steerer tube) 2 of the bicycle fork 1 is rotatably borne within the head tube 10 (shown as a dashed-dotted line in FIGS. 1, 2 and 6) of a bicycle frame with the aid of a lower headset bearing 11 and an upper headset bearing 12. A lower tube 13 and an upper tube 14 of the bicycle frame converge at the head tube 10 and define a conjoined, continuous interior space within the bicycle frame. The fork shaft 2 comprises an engaging segment 3, which is configured in a tapered (e.g., cone-shaped or bell-shaped) manner in the depicted exemplary embodiment and forms the lower end of the fork shaft 2, as well as a cylindrical fork shaft segment 4 that forms the upper end (segment) of the fork shaft 2. The steering axis 5 extends radially-symmetrically through the upper and lower headset bearings 11, 12, is defined by these, and forms the axis about which the bicycle fork 1 is rotatably borne (rotatable) in the head tube 10. With regard to the steering axis 5, the cylindrical fork shaft segment 4 is configured eccentrically, such that its central longitudinal- and/or symmetry axis defines the fork shaft axis (central longitudinal axis) 6 that is spaced apart from the steering axis 5. The steering axis 5 and the fork shaft axis 6 extend in parallel, are both disposed in the plane of symmetry of the bicycle fork 1 and are spaced apart from one another in a direction of eccentricity by the eccentric distance e. The eccentric distance e in the depicted exemplary embodiment amounts to 3 mm; the direction of eccentricity points opposite to the direction of travel.

The tapered fork shaft segment 3, on which the lower headset bearing 11 engages (sits), has a cone of 45° with respect to (centered on) the steering axis 5. The lower headset bearing 11 has a corresponding 45° chamfer on its lower inner side. In this embodiment, a frustoconical (truncated conical) support surface or engagement (seating) surface is achieved with a width of 5 mm.

Both headset bearings 11, 12 have an inside dimension (diameter) of 1.5 inches (38.1 mm). A vacant installation space (clearance) is thereby defined around the cylindrical fork shaft segment 4 inside the upper headset bearing 12. A reduction sleeve 15 is disposed in this vacant installation space. The reduction sleeve 15 serves to guide-through (hold) four brake and/or gear shift cables 33, only one of which is depicted in FIG. 1. The reduction sleeve 15 and the arrangement of the four brake and/or gear shift cables 33 are depicted in more detail in FIGS. 2 to 6.

A standard expander component 17 is also provided in the cylindrical hollow interior of the upwardly open fork shaft 2, with the aid of which the handlebar stem 16 (or a handlebar stem unit) braces the fork shaft 2 via the headset bearings 11, 12 against the head tube 10.

Figure 2:
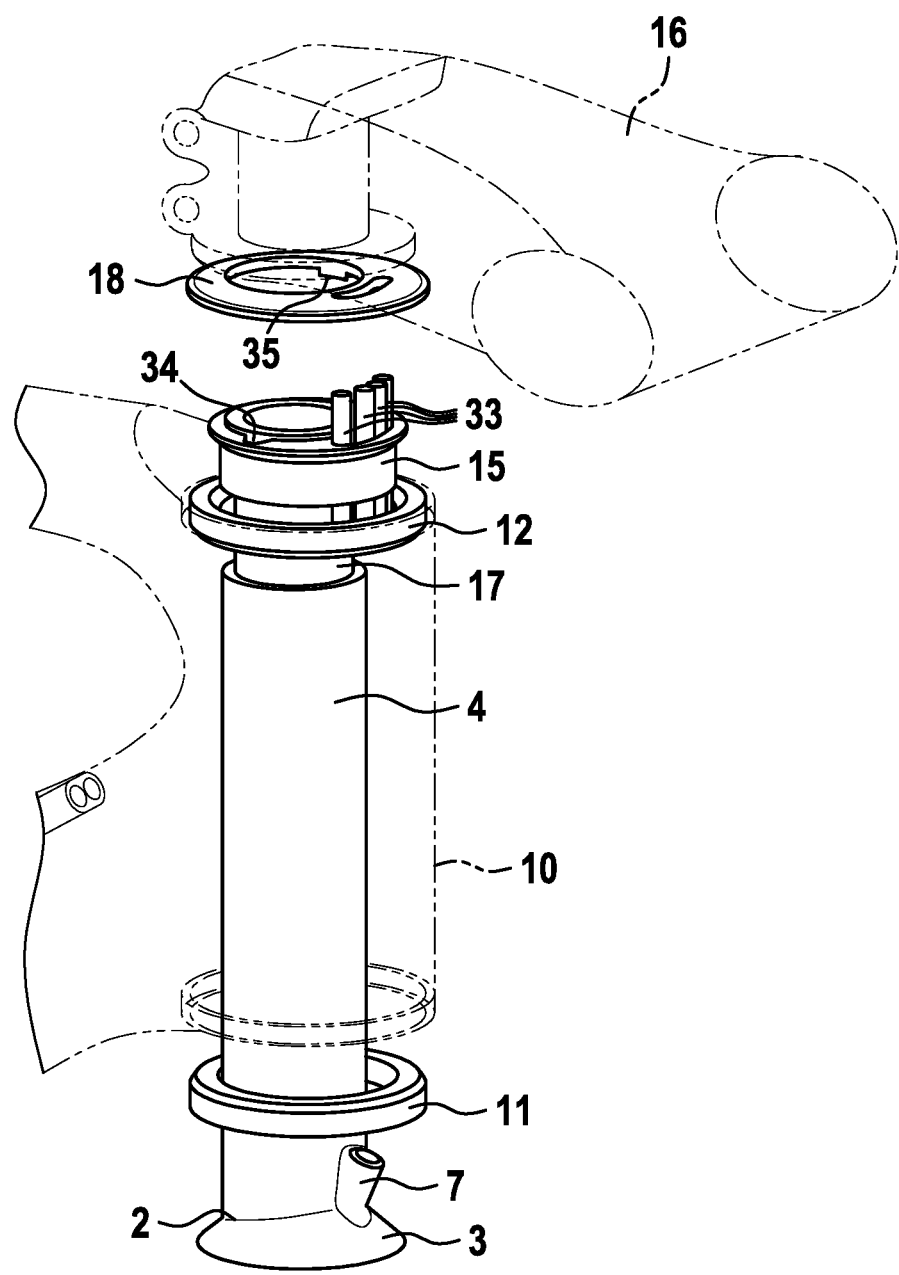
FIG. 2 shows an exploded perspective view of the bicycle fork in the bicycle frame.

A feed-through opening 7 in the fork shaft 2 is also depicted in the exploded view of FIG. 2, via which the brake cable 33 of the front wheel brake is guided at (through) the junction between the cylindrical fork shaft segment 4 and the tapered engaging segment 3 into the interior of the bicycle fork (more specifically, into the cone of the engagement segment 3).

Figure 3:
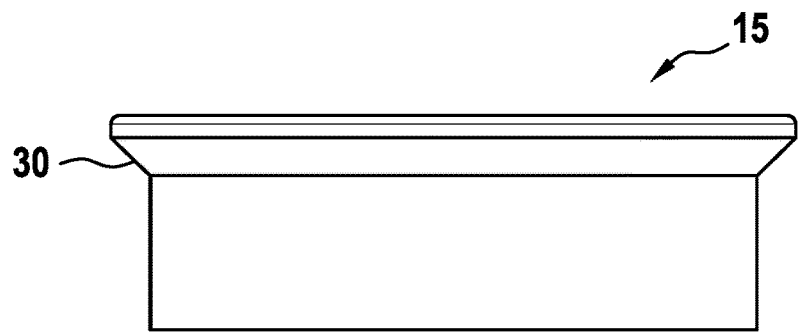
FIGS. 3 to 5 respectively show a side view, a plan view and a perspective view of a reduction sleeve.
Figure 4:
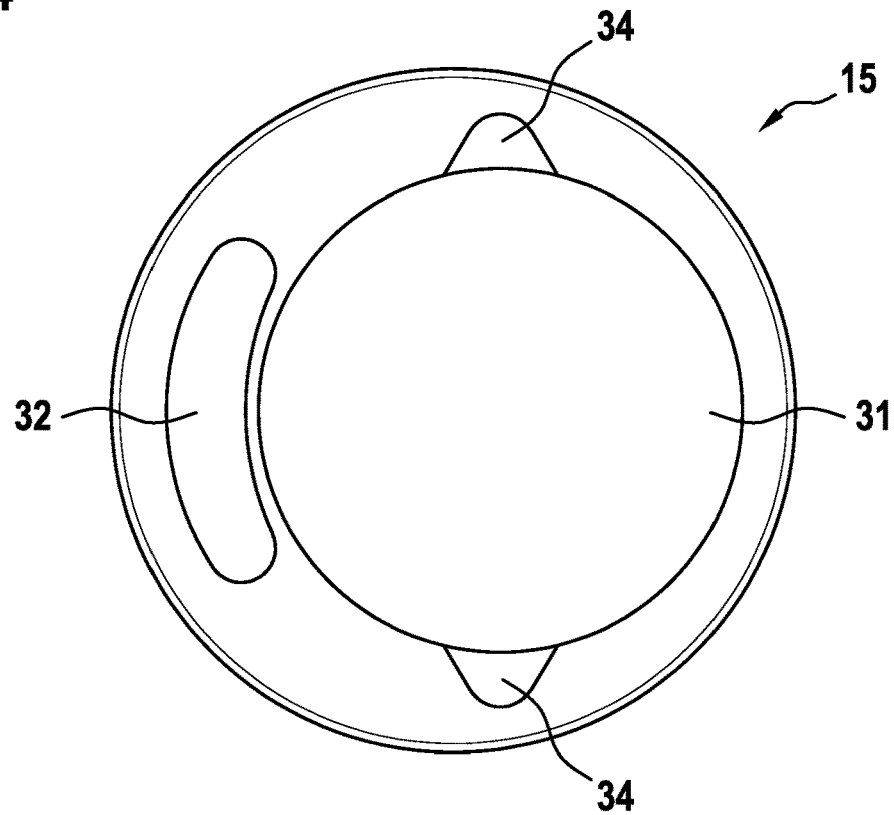
Figure 5:
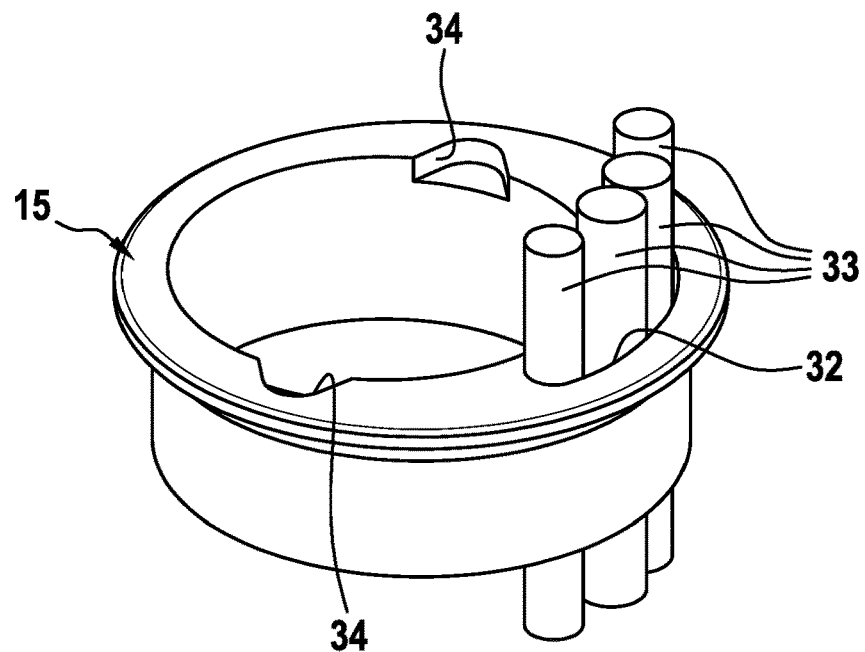

The reduction sleeve 15 is depicted in a more detailed manner in FIGS. 3 to 5. The reduction sleeve 15 comprises an engaging segment 30 having a 45° cone for engaging (sitting) on the upper headset bearing 12, which cone is configured analogously to the tapered engaging segment 3 of the fork shaft 2 for engaging (sitting) on the lower headset bearing 11. The reduction sleeve 15 further comprises a circular through-hole 31 for receiving (holding) the cylindrical fork shaft segment 4, which circular through-hole is configured eccentrically with respect to the engaging segment 30. Further, the reduction sleeve 15 comprises an elongated, kidney-shaped, continuous guide window 32 for guiding-through (holding) of four cables or cable sheaths 33 disposed side by side, namely two gear shift cables and two brake cables. Further, the reduction sleeve 15 comprises depressions (recesses) 34 for engagement (interference-fit) of corresponding protrusions 35 in a cap ring 18 disposed thereabove, whereby the cap ring 18 and the reduction sleeve 15 are interconnected in rotatably locked manner.

Figure 6:
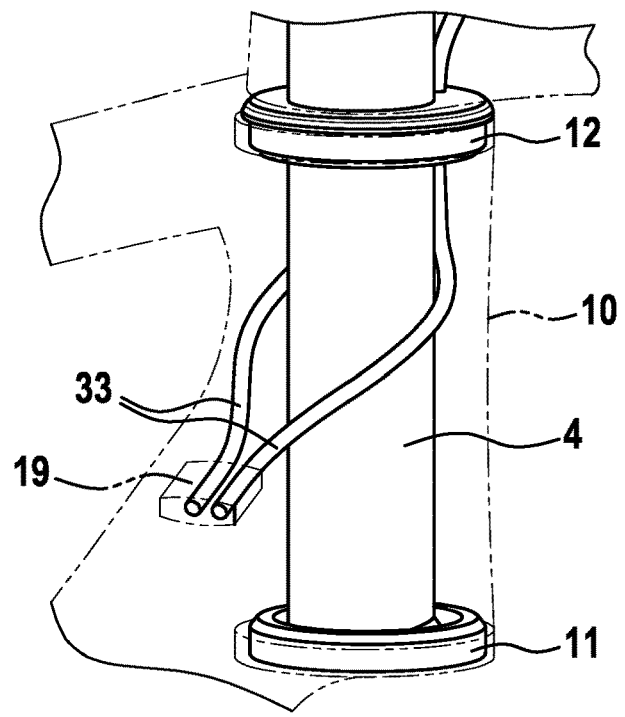
FIG. 6 shows a perspective view of a cable stop in the lower tube and of gear shift cables guided according to the present teachings.

According to the present design, the four brake and/or gear shift cables 33 are guided (disposed) entirely within the interior of the bicycle frame, starting from the respective operating controls on the handlebar, through the handlebar stem 16 and the guide window 32 of the reduction sleeve 15 and into the interior of the head tube 10. From there, as depicted in FIG. 6, the two gear shift cables 33 are led, e.g., around the cylindrical fork shaft segment 4 up to a cable stop 19 disposed at the front end of the lower tube 13 and then without a cable sheath from there rearward to the bicycle gears. On the other hand, the brake cable 33 of the front wheel brake is guided, starting from the guide window 32 in the reduction sleeve 15, through the feed-through opening 7 in the fork shaft 2 and into the interior of the bicycle fork 1 (more specifically, into the interior of the cone of the engaging segment 30).

The cylindrical fork shaft segment 4 in the depicted exemplary embodiment has an outer diameter of 1.25 inches (31.8 mm), whereby the cylindrical fork shaft segment 4 has standard dimensions and/or a standard shape (cylindrical) also on the inner side, such that the usage of a standard expander component 17 is possible; in the depicted exemplary embodiment, an expander component 17 for a fork shaft 2 having an outer diameter of 1.25 inches (31.8 mm) is provided accordingly.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved eccentric bicycle forks, as well as bicycle frames and bicycles that comprise such eccentric bicycle forks.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Additional representative embodiments of the present disclosure, include but are not limited to:

1. A bicycle fork (1) having a fork shaft (2) configured for rotatable bearing about a steering axis (5) in a head tube (10) of a bicycle frame, wherein the fork shaft comprises a cylindrical fork shaft segment (4) that is configured eccentrically with respect to the steering axis.

2. The bicycle fork (1) according to embodiment 1, characterized in that the cylindrical fork shaft segment (4) forms the uppermost segment and/or the upper end of the fork shaft (2).

3. The bicycle fork (1) according to embodiment 1 or 2, characterized in that the cylindrical fork shaft segment (4) has a fork shaft axis (6) that extends within a symmetry plane of the bicycle fork and/or extends parallel to the steering axis (5), is spaced apart from the steering axis and is offset with respect to the steering axis in a direction of eccentricity by an eccentric distance (e), preferably by 1 to 5 mm, particularly preferably by 3 mm, wherein the direction of eccentricity preferably points opposite to the direction of travel.

4. The bicycle fork (1) according to any of the preceding embodiments, characterized in that the cylindrical fork shaft segment (4) has a hollow interior with a cylindrical inner side.

5. The bicycle fork (1) according to any of the preceding embodiments, characterized in that the fork shaft (2) includes at its lower end an engaging segment (3) for engaging a lower headset bearing (11), preferably in the form of a tapered fork shaft segment, particularly preferably having a cone angle between 30° and 60°, in particular of 45°.

6. The bicycle fork (1) according to embodiment 5, characterized in that the cone of the tapered fork shaft segment has a circular outer cross section in a plane perpendicular to the steering axis (5) and/or to the fork shaft axis (6), the circle center point of said circular outer cross section coinciding with the steering axis.

7. The bicycle fork (1) according to any of the preceding embodiments, characterized in that, along the fork shaft axis and/or steering axis (5, 6), the height of the fork shaft (2) amounts to 100 to 400 mm and/or the height of the engaging segment (3) amounts to 3 to 10 mm, preferably 5 mm, and/or the height of the cylindrical fork shaft segment (4) amounts to 90 to 397 mm.

8. The bicycle fork (1) according to any of the preceding embodiments, characterized in that the fork shaft (2) consists of the engaging segment (3), the cylindrical fork shaft segment (4) and preferably a feed-through opening (7) for the brake cable of the front wheel brake.

9. The bicycle fork according to any of the preceding embodiments, characterized in that the cylindrical fork shaft segment (4) has a diameter in the range of 20 to 40 mm, in particular a diameter of 25.4 mm, 28.6 mm or 31.8 mm.

10. The bicycle fork (1) according to any of embodiments 5 to 9, characterized in that the engaging segment (3) is adapted for engagement of a 1.5-inch bearing and/or the cone of the tapered fork shaft segment has cross-sectional radii at least in the range of 38.1 to 41.6 mm.

11. The bicycle fork (1) according to any of embodiments 5 to 9, characterized in that the engaging segment (3) is adapted for engagement of a 1.25-inch bearing and/or the cone of the tapered fork shaft segment has cross-sectional radii at least in the range of 31.8 to 35.3 mm.

12. A bicycle frame comprising a head tube (10), in which a bicycle fork (1) according to any of embodiments 1 to 11 is rotatably borne in an upper and a lower headset bearing (11, 12).

13. The bicycle frame according to embodiment 12, characterized in that the cylindrical fork shaft segment (4) has a smaller outer diameter than the inside measurement of the upper headset bearing (12).

14. The bicycle frame according to embodiment 12 or 13, characterized in that the cylindrical fork shaft segment (4) extends through the upper headset bearing (12).

15. The bicycle frame according to any of embodiments 12 to 14, further comprising a reduction sleeve (15) that engages on the cylindrical fork shaft segment (4) and the upper headset bearing (12).

16. The bicycle frame according to embodiment 15, characterized in that the reduction sleeve (15) has an engaging segment (30) for engaging on the upper headset bearing (12), preferably in the form of a tapered segment having a cone that has a circular outer cross section in a plane perpendicular to the steering axis (5), the circle center point of said circular outer cross section coinciding with the steering axis, wherein the cone preferably has a height along the steering axis in the range of 3 to 10 mm, preferably of 5 mm, and/or the cone has a cone angle between 30° and 60°, in particular of 45°, with respect to the steering axis.

17. The bicycle frame according to embodiment 15 or 16, characterized in that the reduction sleeve (15) has a circular through-hole (31), which is preferably disposed eccentrically with respect to the engaging segment (30) of the reduction sleeve.

18. The bicycle frame according to any of embodiments 15 to 17, characterized in that the reduction sleeve (15) has a continuous guide window (32) for brake and/or gear shift cables or cable sheaths (33), preferably for four cable sheaths, particularly preferably cable sheaths for two brake cables and two gear shift cables.

19. The bicycle frame according to embodiment 18, characterized in that the brake and/or gear shift cables (33), preferably the two brake cables and the two gear shift cables, are guided parallel to the fork shaft axis (6) and/or the steering axis (5) through the guide window (32) and/or extend at least within the guide window in the respective cable sheaths.

20. The bicycle frame according to embodiment 18 or 19, characterized in that the guide window (32) is disposed between the circular through-hole (31) and the engagement segment (30), preferably opposite to the direction of eccentricity of the circular through-hole and/or in or symmetrical to a plane that comprises the fork shaft axis (6) and the steering axis (5).

21. The bicycle frame according to any of embodiments 15 to 20, characterized in that the reduction sleeve (15) has one or more depressions (34) on its upper side for form-fit engagement of corresponding protrusions (35) of a cap ring (18) disposed thereabove, whereby a rotationally locked connection of the cap ring and the reduction sleeve is achieved with respect to a rotation about the fork shaft axis (6).

22. The bicycle frame according to any of embodiments 12 to 21, characterized by a cable stop (19) in the lower tube (13) for one, two or three mechanical gear shift and/or brake cables (33), which is preferably disposed at the front end of or in the vicinity of the front end of the lower tube, particularly preferably at a distance of 2 to 20 cm from the steering axis (5).

23. The bicycle frame according to any of embodiments 12 to 22, characterized in that a brake cable (33) for the front wheel brake is guided-through a feed-through (7) in the fork shaft (2), preferably in the cylindrical fork shaft segment (4) or at the junction between the cylindrical fork shaft segment and the engaging segment (3), into the interior of the bicycle fork (1).

24. The bicycle frame according to any of embodiments 12 to 23, characterized in that the upper and the lower headset bearing (11, 12) each have the same measurements, preferably 1.25 or 1.5 inches.

25. The bicycle frame according to any of embodiments 12 to 24, characterized in that the upper headset bearing (12) is a 1.5-inch bearing and the cylindrical fork shaft segment (4) has an outer diameter of 1.25 inches (31.8 mm).

26. The bicycle frame according to any of embodiments 12 to 24, characterized in that the upper headset bearing (12) is a 1.25-inch bearing and the cylindrical fork shaft segment (4) has an outer diameter of 1.125 inches (28.6 mm) or 1 inch (25.4 mm).

27. The bicycle frame according to any of embodiments 12 to 26, characterized in that the brake and/or gear shift cables (33) are mechanical, hydraulic and/or electrical cables.

28. The bicycle frame according to any of embodiments 18 to 27, characterized in that all the gear shift and/or brake cables (33), each having a cable sheath, are guided-through the guide window (32) of the reduction sleeve (15).

29. The bicycle frame according to any of embodiments 12 to 28, characterized by a single- or multi-core electrical cable that extends together with, or as an alternative to, the brake cable (33) of the front wheel brake through the feed-through opening (7) in the fork shaft (2) and through the guide window (32) of the reduction sleeve (15).

30. The bicycle frame according to any of embodiments 12 to 29, characterized in that the lower headset bearing (11) has a 45° chamfer on the lower inner side that engages on the tapered fork shaft segment (3).

31. The bicycle frame according to any of embodiments 15 to 30, characterized in that the upper headset bearing (12) has a 45° chamfer on the upper inner side that engages on the circular, tapered segment (30) of the reduction sleeve (15).

32. The bicycle frame according to any of embodiments 12 to 31, characterized in that the headset is a threaded headset or a non-threaded headset, which preferably comprises exclusively standard components.

33. The bicycle frame according to any of embodiments 12 to 32, characterized in that an expander component (17) for mounting a handlebar stem (16) is provided in the interior of the fork shaft (2), wherein the expander component is preferably a standard expander component and/or an expander having a standard dimension, which is particularly preferably configured to be rotationally symmetrical.

34. A bicycle comprising a bicycle frame according to any of embodiments 12 to 32 and/or a bicycle fork (1) according to any of embodiments 1 to 11.

I claim:

1. A bicycle fork comprising:
a fork shaft rotatably borne in a head tube of a bicycle frame so as to rotate about a steering axis,
wherein the fork shaft comprises a cylindrical fork shaft segment that is disposed eccentrically with respect to the steering axis.

2. The bicycle fork according to claim 1, wherein the cylindrical fork shaft segment is an uppermost segment or an upper end of the fork shaft.

3. The bicycle fork according to claim 2, wherein:
the cylindrical fork shaft segment is a circular cylinder having a hollow interior, a cylindrical inner surface and a central longitudinal axis,
the central longitudinal axis lies within a symmetry plane of the bicycle fork and extends parallel to the steering axis, and
the central longitudinal axis is spaced apart from the steering axis in a direction of eccentricity by an eccentric distance of 1 to 5 mm, the direction of eccentricity pointing in an opposite direction with respect to a forward direction of travel of the bicycle.

4. The bicycle fork according to claim 1, further comprising:
an engaging segment configured to engage a lower headset bearing,
wherein the engaging segment adjoins a lower end of the cylindrical fork shaft segment, and
the engaging segment is in the form of a cone shape having a cone angle of 30-60°.

5. The bicycle fork according to claim 4, wherein:
the cone shape of the engaging segment has a circular outer cross section in a plane perpendicular to the steering axis, and
the steering axis intersects a circle center point of the circular outer cross section.

6. The bicycle fork according to claim 1, further comprising a feed-through opening defined in the bicycle fork and configured to pass-through a brake cable of the front wheel brake.

7. A bicycle frame comprising:
a head tube,
an upper headset bearing and a lower headset bearing respectively disposed at least partially within an upper interior end and a lower interior end of the head tube, and
the bicycle fork according to claim 1 rotatably borne in the upper and lower headset bearings.

8. The bicycle frame according to claim 7, wherein the cylindrical fork shaft segment has a smaller outer diameter than an inside diameter of the upper headset bearing.

9. The bicycle frame according to claim 8, further comprising:
a reduction sleeve disposed between the cylindrical fork shaft segment and the upper headset bearing.

10. The bicycle frame according to claim 9, wherein:
the reduction sleeve has a cone-shaped engagement segment that sits on a chamfer defined in the upper headset bearing,
the cone-shaped engagement segment has a circular outer cross section in a plane perpendicular to the steering axis,
the steering axis intersects a circle center point of the circular outer cross section of the cone-shaped engagement segment,
the cone-shaped engagement segment has a height in a direction parallel to the steering axis of 3 to 10 mm, and
a cone of the cone-shaped engagement segment has a cone angle of 30-60° with respect to the steering axis.

11. The bicycle frame according to claim 10, wherein the reduction sleeve has a circular through-hole that is disposed eccentrically with respect to the cone-shaped engagement segment of the reduction sleeve, the cylindrical fork shaft segment extending through the circular through-hole.

12. The bicycle frame according to claim 9, wherein the reduction sleeve has a continuous guide window configured to receive a plurality of brake and/or gear shift cables.

13. The bicycle frame according to claim 12, wherein:
the guide window is disposed between a circular through-hole that receives the cylindrical fork shaft segment and an outer circumference of the reduction sleeve; and
the plurality of brake and/or gear shift cables extends through the guide window and in parallel to the steering axis.

14. The bicycle frame according to claim 9, wherein:
at least one depression is defined on an upper side of the reduction sleeve,
a cap ring having at least one corresponding protrusion is disposed on the reduction sleeve,
the at least one corresponding protrusion is interference-fit in the at least one depression, and
the cap ring and reduction sleeve are interlocked via the at least one depression and the at least one corresponding protrusion so as to rotate together about the steering axis.

15. The bicycle frame according to claim 7, further comprising:
a hollow lower tube continuously extending from the head tube, and
a cable stop disposed in the lower tube,
wherein a gear shift cable or a brake cable is connected to the cable stop at a distance of 2 to 20 cm from the steering axis.

16. The bicycle frame according to claim 7, further comprising an expander component for mounting a handlebar stem,
wherein the expander component is disposed in the interior of the cylindrical fork shaft segment and is rotationally symmetrical.

17. A bicycle frame comprising:
a head tube having a first central longitudinal axis defining a steering axis of a handlebar, the steering axis lying within a symmetry plane of the bicycle frame,
an upper headset bearing and a lower headset bearing respectively disposed at least partially within an upper interior end and a lower interior end of the head tube, and
a bicycle fork comprising a cylindrical fork shaft segment;
wherein the cylindrical fork shaft segment is rotatably borne in the upper and lower headset bearings so as to rotate about a steering axis, the cylindrical fork shaft segment is a circular cylinder having a hollow interior, a cylindrical inner surface and a second central longitudinal axis, the second central longitudinal axis lies within the symmetry plane of the bicycle frame and extends parallel to the steering axis, and the central longitudinal axis is spaced apart from the steering axis in a direction of eccentricity by an eccentric distance of 1 to 5 mm, the direction of eccentricity pointing in an opposite direction with respect to a forward direction of travel of the bicycle.

18. The bicycle frame according to claim 17, further comprising:

a reduction sleeve disposed between the cylindrical fork shaft segment and the upper headset bearing, wherein:

the reduction sleeve has a circular through-hole, the cylindrical fork shaft segment extends through the circular through-hole, the reduction sleeve has a guide window disposed between the circular through-hole and an outer circumference of the reduction sleeve, a plurality of brake and/or gear shift cables extends through the guide window and in parallel to the steering axis, such that the plurality of brake and/or gear shift cables are disposed between the cylindrical fork shaft segment and the head tube, and the upper headset bearing and the lower headset bearing have the same inside diameter.

19. The bicycle frame according to claim 18, wherein:

the bicycle fork further comprises an engaging segment adjoining a lower end of the cylindrical fork shaft segment, the engaging segment being in the form of a cone shape having a cone angle of 30-60° and acting as a seat for the lower headset bearing, the cone shape of the engaging segment has a circular outer cross section in a plane perpendicular to the steering axis, the steering axis intersects a circle center point of the circular outer cross section, a feed-through opening is defined in the bicycle fork, and one brake cable of the plurality of brake and/or gear shift cables passes through the feed-through opening into an interior of the cone shape of the engaging segment.

20. The bicycle frame according to claim 19, wherein:

at least one depression is defined on an upper side of the reduction sleeve, a cap ring having at least one corresponding protrusion is disposed on the reduction sleeve, the at least one corresponding protrusion is interference-fit in the at least one depression, the cap ring and reduction sleeve are interlocked via the at least one depression and the at least one corresponding protrusion so as to rotate together about the steering axis, a hollow lower tube continuously extends from the head tube, a cable stop is disposed in the lower tube, at least one of the plurality of brake and/or gear shift cables is connected to the cable stop at a distance of 2 to 20 cm from the steering axis, and a rotationally symmetrical expander component for mounting a handlebar stem is disposed in the interior of the cylindrical fork shaft segment.

* * * * *